(12) United States Patent
Császár et al.

(10) Patent No.: US 9,264,322 B2
(45) Date of Patent: Feb. 16, 2016

(54) METHOD AND APPARATUS FOR HANDLING NETWORK RESOURCE FAILURES IN A ROUTER

(75) Inventors: András Császár, Budapest (HU); Gabor Sandor Enyedi, Bekescsaba (HU); Sriganesh Kini, Fremont, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 556 days.

(21) Appl. No.: 13/811,716
(22) PCT Filed: Oct. 7, 2010
(86) PCT No.: PCT/EP2010/065040
§ 371 (c)(1),
(2), (4) Date: May 22, 2013
(87) PCT Pub. No.: WO2012/013251
PCT Pub. Date: Feb. 2, 2012

(65) Prior Publication Data
US 2013/0232259 A1 Sep. 5, 2013

Related U.S. Application Data

(60) Provisional application No. 61/369,158, filed on Jul. 30, 2010.

(51) Int. Cl.
G06F 15/16 (2006.01)
H04L 12/26 (2006.01)
(Continued)

(52) U.S. Cl.
CPC ............ *H04L 43/04* (2013.01); *H04L 43/0817* (2013.01); *H04L 45/025* (2013.01); *H04L 45/028* (2013.01); *H04L 45/22* (2013.01); *H04L 45/28* (2013.01)

(58) Field of Classification Search
None
See application file for complete search history.

(56) References Cited

U.S. PATENT DOCUMENTS 6,697,325 B1 2/2004 Cain
7,184,437 B1 2/2007 Cole et al.
(Continued)

FOREIGN PATENT DOCUMENTS

WO 2012000557 A1 1/2012

OTHER PUBLICATIONS

Markopoulou, A. et al., "Characterization of Failures in an IP Backbone", Research at Intel, IR-TR-2004-250, 2004, pp. 1-12, Intel Corporation, [Retrieved on Jan. 17, 2013], Retrieved from Internet: http://www.intel-research.net/Publications/Cambridge/031820050728_305.pdf.

(Continued)

*Primary Examiner* — Mohamed Ibrahim
(74) *Attorney, Agent, or Firm* — Coats & Bennett, PLLC

(57) ABSTRACT

There is provided a method for use by a router in a communications network. Forwarding information is maintained (S1) which specifies the next hop node for each of a plurality of possible destination nodes. Update information is maintained (S1) which specifies how, if at all, the next hop nodes specified in the forwarding information are to be updated for a plurality of possible network resource failures. Known failure information is maintained (S1) which relates to a known network resource failure or which specifies that there is no known network resource failure. A failure notification is received (S2) relating to a network resource failure. In response to receipt of the failure notification, it is determined (S3) from the failure notification how, if at all, the known failure information is to be updated, and the known failure information is updated, if required, based on the determination (S4). A communications packet is received (S5). Various steps (S6 to S10) are carried out in response to receipt of the communications packet. The destination node for the received packet is determined (S6). It is determined (S7) whether the next hop node specified by the forwarding information for the determined destination node is potentially invalid in view of the known failure information. If so, then the next hop node for the determined destination node is updated if necessary in the forwarding information using the update information and the known failure information (S8). The next hop node is determined for the received packet using the forwarding information and the determined destination node (S9). The received packet is forwarded towards the determined next hop node (S10).

18 Claims, 13 Drawing Sheets

(51) Int. Cl.
  *H04L 12/751* (2013.01)
  *H04L 12/759* (2013.01)
  *H04L 12/707* (2013.01)
  *H04L 12/703* (2013.01)

(56) References Cited

U.S. PATENT DOCUMENTS

| | | | | |
|---|---|---|---|---|
| 7,633,860 B2* | 12/2009 | Li | ............... | H04L 41/06068 370/225 |
| 7,738,365 B2* | 6/2010 | Chao | ............... | H04L 45/00 370/228 |
| 2002/0131362 A1 | 9/2002 | Callon | | |
| 2003/0126287 A1* | 7/2003 | Charny | ............... | H04L 41/0896 709/239 |
| 2004/0167988 A1* | 8/2004 | Rune | ............... | H04L 12/4616 709/238 |
| 2005/0076231 A1 | 4/2005 | Ichinohe et al. | | |
| 2011/0273980 A1* | 11/2011 | Ashwood Smith | ..... | H04L 45/00 370/225 |

OTHER PUBLICATIONS

Enyedi, G. et al., "Finding Multiple Maximally Redundant Trees in Linear Time", Department of Telecommunications and Media Informatics, Budapest University of Technology and Economics, Hungary, [Retrieved on Jan. 17, 2013], Retrieved from Internet: http://opti.tmit.bme.hu/~enyedi/ipfrr/distMaxRedTree.pdf.

Kvalbein, A. et al., "Fast IP Network Recovery Using Multiple Routing Configurations", IEEE/ACM Transactions on Networking (TON); 25th IEEE International Conference on Computer Communications, Barcelona, Spain, Conference Publication, Apr. 1, 2006, pp. 1-11, Print ISBN: 1-4244-0221-2. IEEE.

Shand, M. et al., "IP Fast Reroute Framework", Internet Engineering Task Force (IETF), Request for Comments: 5714, Jan. 1, 2010, pp. 1-16, ISSN: 2070-1721, [Retrieved on Jan. 17, 2013], Retrieved from Internet: http://tools.ietf.org/html/rfc5714.

Shand, M. et al., "IP Fast Reroute Using Not-via Addresses draft-ietf-rtgwg-ipfrr-notvia-addresses-05", IETF Network Working Group Internet-Draft, Mar. 5, 2010, pp. 1-32, [Retrieved on Jan. 17, 2013], Retrieved from Internet: http://tools.ietf.org/html/draft-ietf-rtgwg-ipfrr-notvia-addresses-05.

Wang, J. et al., "IP Fast Reroute with Failure Inferencing", Proceedings of the 2007 SIGCOMM workshop on Internet network management (INM'07), Aug. 27, 2007, Kyoto, Japan, pp. 268-273, ACM, NY, USA.

Enyedi, G. et al., "IP Fast ReRoute: Lightweight Not-Via without Additional Addresses", INFOCOM 2009, Rio de Janeiro, Brazil, Conference Publication, Apr. 19, 2009, pp. 2771-2775. IEEE.

Hokelek, I. et al., "Loop-Free IP Fast Reroute Using Local and Remote LFAPs draft-hokelek-rlfap-01.txt", IETF Network Working Group Internet-Draft, Feb. 25, 2008, pp. 1-17, [Retrieved on Jan. 17, 2013], Retrieved from Internet: http://tools.ietf.org/html/draft-hokelek-rlfap-01.

Enyedi, G. et al., "On Finding Maximally Redundant Trees in Strictly Linear Time", IEEE Symposium on Computers and Communications (ISCC 2009), Sousse, Tunisia, Conference Publication, Jul. 5, 2009, pp. 206-211. IEEE.

Atlas, A., "U-turn Alternates for IP/LDP Fast-Reroute draft-atlas-ip-local-protect-uturn-03", IETF Network Working Group Internet-Draft, Feb. 1, 2006, pp. 1-30, [Retrieved on Jan. 17, 2013], Retrieved from Internet: http://tools.ietf.org/html/draft-atlas-ip-local-protect-uturn-03.

Atlas, A. et al., "Basic Specification for IP Fast Reroute: Loop-Free Alternates", IETF Network Working Group Request for Comments: 5286, Standards Track, Sep. 1, 2008, pp. 1-32, [Retrieved on Jan. 17, 2013], Retrieved from Internet: http://tools.ietf.org/html/rfc5286.

* cited by examiner

Without any info in S: loop

Default shortest path

— Link not in spanning tree
— Link in spanning tree

— Link not in spanning tree
— Link in spanning tree

FIG. 13

| Source node: | | s | s | s | s | s | s | s |
|---|---|---|---|---|---|---|---|---|
| Destination node: | | a | b | c | d | e | f | r |
| Default next hop: | | a | b | b | b | e | b | b |
| New next hop node if failure in: | SRLG1 | a | (a) | (e) | (a) | e | (e) | (a) |
| | SRLG2 | b | b | b | b | e | b | b |
| | SRLG3 | a | b | b | b | e | b | b |
| | SRLG4 | a | b | b | b | e | b | b |
| | SRLG5 | a | b | b | b | (b) | b | b |
| | SRLG6 | a | b | b | b | e | b | b |
| | SRLG7 | a | b | b | b | e | b | b |
| | SRLG8 | a | b | b | b | e | b | b |

FIG. 14

| Source node: | | s | s | s | s | s | s | s |
|---|---|---|---|---|---|---|---|---|
| Destination node: | | a | b | c | d | e | f | r |
| Default next hop: | | a | b | b | b | e | b | b |
| New next hop node if failure in node: | a | (✗) | b | b | b | e | b | b |
| | b | a | (✗) | (e) | (e) | e | (e) | (e) |
| | c | a | b | (✗) | b | e | (e) | b |
| | d | a | b | b | (✗) | e | b | b |
| | e | a | b | b | b | (✗) | b | b |
| | f | a | b | b | b | e | (✗) | b |
| | r | a | b | b | b | e | b | (✗) |

FIG. 15
(Source node: s)

| (Dest node) | (Failure in) → (change to next hop node) |
|---|---|
| a | SRLG2 → b |
| b | SRLG1 → a |
| c | SRLG1 → e |
| d | SRLG1 → a |
| e | SRLG5 → b |
| f | SRLG1 → e |
| r | SRLG1 → a |

FIG. 16
(Source node: s)

| (Dest node) | (Failure in) → (change to next hop node) | | |
|---|---|---|---|
| a | a → ✗ | | |
| b | b → ✗ | | |
| c | b → e | c → ✗ | |
| d | b → e | d → ✗ | |
| e | e → ✗ | | |
| f | b → e | c → e | r → ✗ |
| r | b → e | r → ✗ | |

| Verdict: SRLG1 | (from node s) {SRLG1, node b} | (from node f) {SRLG1, node c} |

| Verdict: node b | (from node s) {SRLG1, node b} | (from node a) {SRLG3, node b} | (from node d) {SRLG8, node b} | (from node c) {SRLG1, node b} |

| SRLG lists | | FIB | |
| --- | --- | --- | --- |
| | | Destination | Next Hop |
| a | SRLG2 →b | a | a |
| b | SRLG1 →a | b | a |
| c | SRLG1 →e | c | e |
| d | SRLG1 →a | d | a |
| e | SRLG5 →b | e | e |
| f | SRLG1 →e | f | e |
| r | SRLG1 →a | r | a |

METHOD AND APPARATUS FOR HANDLING NETWORK RESOURCE FAILURES IN A ROUTER

TECHNICAL FIELD

The present invention relates to a method and apparatus for handling network resource failures in a router.

BACKGROUND

Traditional IP routing (e.g. Interior Gateway Protocols [IGPs] such as Open Shortest Path First [OSPF] or Intermediate System to Intermediate System [ISIS]) has relatively slow fail-over properties. Hence, the Internet Engineering Task Force (IETF) routing working group and also the research community has been considering several alternatives for IP Fast Re-Route (IPFRR).

The basic components of almost all previously considered IPFRR proposals are the following:

Fast failure detection, locally. This is assumed to be already existing. Mechanisms exist like Bidirectional Forwarding Detection (BFD) or lower layer upcalls if the lower layer detects the failure (loss of signal). IPFRR solutions rely on fast failure detection but do not target it as a problem.

Pre-calculated backup paths. The routing engine can prepare for failures by pre-calculating alternate paths (i.e. alternate next-hops) that should be used in case of failures.

Pre-downloaded backup forwarding entries. The next-hops are not only pre-calculated but they are also pre-downloaded into the forwarding engine, i.e. the linecards so that they can be used instantly upon a trigger.

Switch-over to backup forwarding entries within the forwarding engine. The fast failure detection is processed in the line cards and the FIB change is performed locally and instantly without any involvement of the control plane. (FIB stands for Forwarding Information Base, and is also known as a Forwarding Table.)

Ensure consistent forwarding in other hops. Since no one else knows about the failure every other node has the same FIB as before the failure. Due to IP's hop-by-hop forwarding nature, a neighbour might route the packet back towards the point of local repair (still believing that it is the shortest path) which results in a forwarding loop, meaning that the failure was not handled. See FIG. 1 of the accompanying drawings.

Some previous proposals suggest suppressing IGP convergence temporarily. The goal is to see if failure is persistent, and if yes then let the control plane IGP re-converge onto new paths globally. Otherwise, in case of transient failures, it is possible to completely hide down and up events quickly following each other. When the failure disappears, it is possible to use the original paths, and avoid unnecessary Control Processor (CP) reconfiguration.

The above mechanism is extremely useful to eliminate a big portion of the tasks that traditional re-routing procedures performed: to be able to respond to a failure there is no need to start calculating the new paths (a control plane task) and there is no need to download the results to the forwarding card.

It can be easily seen that in order to make consistent (i.e. loop-free) forwarding decisions in arbitrary failures on arbitrary topologies, remote nodes must get some form of information about the failure. This is illustrated in FIGS. 1 and 2 of the accompanying drawings.

Almost all existing proposals have tried to provide this information implicitly within the re-routed data packets.

Piggyback on user data packets

Bits in packet header (MRC [A. Kvalbein, A. F. Hansen, T. Cicic, S. Gjessing, O. Lysne, "Fast IP networkrecovery using multiple routing configurations", Network Operations and Management Symposium, 2008. NOMS 2008. IEEE, 2008])

Encapsulation header (Not-Via [S. Bryant, M. Shand, S. Previdi, "IP fast reroute using Not-via addresses", Internet Draft, available online: http://tools.ietf.org/html/draft-ietf-rtgwg-ipfrr-notvia-addresses-05, 2010])

Packet direction (FIFR [J. Wand, S. Nelakuditi, "IP fast reroute with failure inferencing", In Proceedings of ACM SIGCOMM Workshop on Internet Network Management—The Five-Nines Workshop, 2007], LFA U-turn [A. Atlas, "U-turn alternates for ip/ldp fast-reroute", Internet Draft, available online: http://tools.ietf.org/html/draft-atlas-ip-local-protect-uturn-03, 2006])

One exception is Loop Free Alternates (LFA) [A. Atlas, A. Zinin, "Basic specification for IP Fast-Reroute: Loop-Free Alternates", Internet Engineering Task Force: RFC 5286, 2008] but that cannot guarantee full failure coverage. LFA is only dealing with failure situations where the node detecting the failure can on its own find an alternate neighbour who provides a loop free path with default routing.

The proposal of Hokelek et al ["Loop-Free IP Fast Reroute Using Local and Remote LFAPs", http://tools.ietf.org/html/draft-hokelek-rlfap-01] makes another important exception. They propose to advertise the failure explicitly in a signalling message, which allows distant nodes to switch to new forwarding configurations upon the reception of the notification.

The present applicant has therefore appreciated that most of the IPFRR solution proposals try to implicitly incorporate the notification into the data packets. There is one exception, LFA [referenced above], which is trying to select safe alternative next-hops which do not loop the packet or do not forward it through the failure. The drawback of LFA is that it cannot guarantee full failure coverage. For example in FIG. 1, in case of link failure A-D, node A has no loop free alternates towards destination D.

The present applicant has appreciated that neither of the existing proposals is acceptable from a practical implementation perspective.

Not-Via [referenced above] and similar solutions rely on tunnelling. However, encapsulation is not preferred due to fragmentation at Maximum Transmission Unit (MTU). Both segmentation and reassembly at the tunnel end-point decrease forwarding performance. Also, Not-Via requires special tunnel endpoint addresses, the management of which is cumbersome. MRC assumes that packet marking is used to encode a new routing configuration ID. There are, however, no viable bits in the IP header for this purpose, and encapsulation would cause the same problems as for Not-via.

FIFR on the other hand relies on interface-specific forwarding, i.e. remote nodes infer the fact of the failure from the incoming direction of the packet. A typical router's design has the same replica of the forwarding table at each linecard (serving multiple interfaces/adjacencies)—an assumption deep in HW/SW which is extremely hard to change.

Explicit failure notification signalling has to be extremely fast not to have the same problem as with the traditional flooding mechanism of OSPF or ISIS. The draft by Hokelek et al about "Loop-Free IP Fast Reroute Using Local and Remote LFAPs" [referenced above] does not describe how the failure notification has to be flooded fast and without additional control plane delays in each hop, or how the FIB has to be updated rapidly.

The reason why the Hokelek et al draft does not deal with such important problems, is that this solution was developed originally for wireless ad-hoc routing; for ad-hoc routing the most important is to minimize the protocol overhead, the area of notification propagation. Since this area was limited seriously (only a few hops), the delay caused by the propagation is insignificant. Moreover, such networks do not have to deal with numerous prefixes, thus updating is not an issue either.

Normally, in the current state of the art, if a Forwarding Processor (FP, typically a linecard) receives a notification packet of a protocol, which needs to be disseminated and processed at the same time, the notification is sent to the separated Control Processor (CP). The CP processes the packet, ensures the flooding of the information and reconfigures the FPs. This is illustrated in FIG. 3 of the accompanying drawings, which shows a process carried out by a previously-considered router. A Forwarding Processor (FP, typically a linecard) receives a notification packet of a protocol in step 1, the notification packet being of a type that needs to be disseminated and processed. The notification is sent to a separate Control Processor (CP) for processing in step 2. The CP processes the packet in step 3, and arranges for the forwarding of the packet to the FPs in step 4, which in turn floods the information to other routers (step 5). Through the processing carried out by the CP, the CP also reconfigures the FPs. However, CP interaction is not preferred if the goal is to provide instant flooding of the incoming message (and maybe even instant processing after flooding). If the control plane is involved then reaction times are hard to be guaranteed to be sub-second, never mind in the order of milliseconds that would be desired for carrier-grade fail-over performance.

It is desirable to find efficient ways of handling failure notifications.

SUMMARY

A method is provided for use by a router in a communications network. Forwarding information is maintained which specifies the next hop node for each of a plurality of possible destination nodes. Update information is maintained which specifies how, if at all, the next hop nodes specified in the forwarding information are to be updated for a plurality of possible network resource failures. Known failure information is maintained which relates to a known network resource failure or which specifies that there is no known network resource failure. A failure notification is received relating to a network resource failure. In response to receipt of the failure notification, it is determined from the failure notification how, if at all, the known failure information is to be updated, and the known failure information is updated, if required, based on the determination. A communications packet is received. Various steps are carried out in response to receipt of the communications packet. The destination node for the received packet is determined. It is determined whether the next hop node specified by the forwarding information for the determined destination node is potentially invalid in view of the known failure information. If so, then the next hop node for the determined destination node is updated if necessary in the forwarding information using the update information and the known failure information. The next hop node is determined for the received packet using the forwarding information and the determined destination node. The received packet is forwarded towards the determined next hop node.

An apparatus for use as or in a router of a communications network is also provided, the apparatus comprising: means for maintaining forwarding information specifying the next hop node for each of a plurality of possible destination nodes; (b) means for maintaining update information specifying how, if at all, the next hop nodes specified in the forwarding information are to be updated for a plurality of possible network resource failures; (c) means for maintaining known failure information relating to a known network resource failure or specifying that there is no known network resource failure; (d) means for receiving a failure notification relating to a network resource failure, and in response to receipt of the failure notification: (i) determining from the failure notification how, if at all, the known failure information is to be updated; (ii) updating the known failure information, if required, based on the determination; (e) means for receiving a communications packet, and in response to receipt of the communications packet: (i) determining the destination node for the received packet; (ii) determining whether the next hop node specified by the forwarding information for the determined destination node is potentially invalid in view of the known failure information; (iii) if so, then updating if necessary the next hop node for the determined destination node in the forwarding information using the update information and the known failure information; (iv) determining the next hop node for the received packet using the forwarding information and the determined destination node; and (v) forwarding the received packet towards the determined next hop node.

There is also provided a program for controlling an apparatus to perform a method as set out above or which, when loaded into an apparatus, causes the apparatus to become an apparatus as set out above. The program may be carried on a carrier medium. The carrier medium may be a storage medium. The carrier medium may be a transmission medium.

There is provided an apparatus programmed by such a program.

There is provided a storage medium containing such a program.

An embodiment of the present invention offers a technical advantage of providing an efficient way of handling failure notifications (of any type). Technical advantages are set out in more detail below.

BRIEF DESCRIPTION OF THE DRAWINGS

FIG. 13 illustrates a SRLG array of node s;

FIG. 14 illustrates a node array for node s;

FIG. 15 illustrates SRLG lists for node s;

FIG. 16 illustrates node lists for node s;

DETAILED DESCRIPTION

Co-pending PCT Patent Application No. PCT/EP2010/059391 describes an efficient and quick mechanism to distribute information between nodes in a network. The mechanism is referred to as Fast Path Notification, or FPN.

FPN was designed to react to events affecting the data plane forwarding engine of nodes and to advertise such information to other nodes. The advertisement can be performed without control plane interaction, hence FPN is as fast as possible. Forwarding of the notifications is basically performed in each node using multicast on the fast-path.

Figure 4:
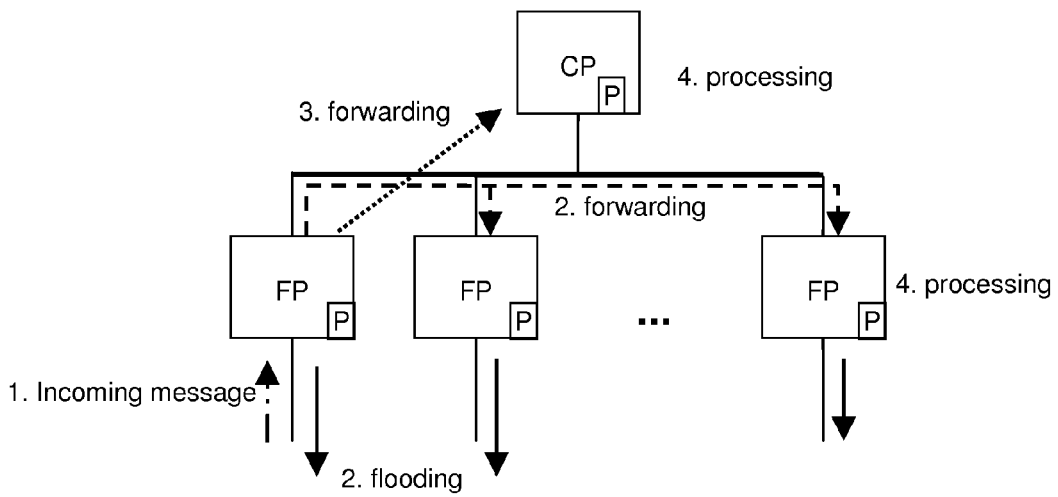
FIG. 4 illustrates a modified process for distributing information.
Figure 5:
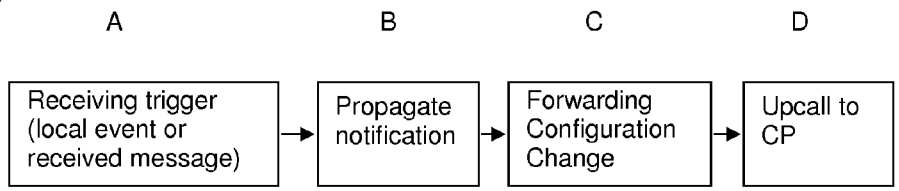
FIG. 5 illustrates steps performed in a Forwarding Engine.

The concept of FPN is illustrated in FIGS. 4 and 5.

Figure 3:
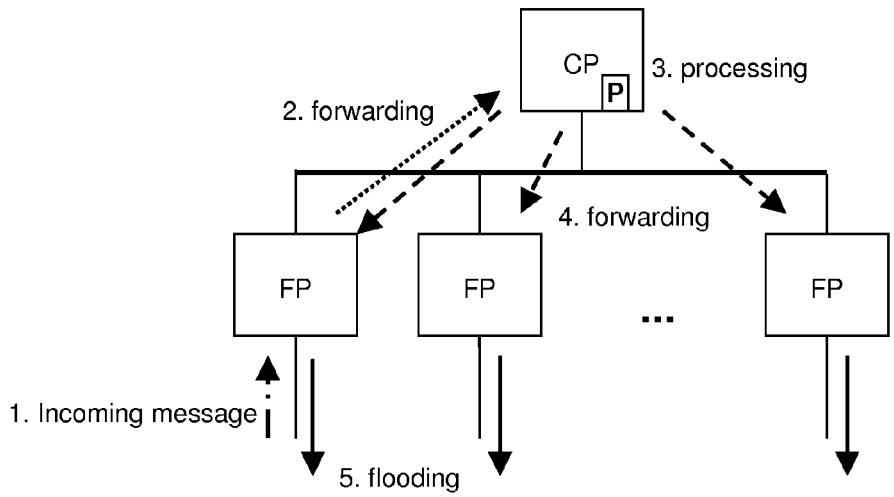
FIG. 3, discussed hereinbefore, illustrates a previously-considered process in a router for flooding information.

FIG. 4 illustrates schematically a process for disseminating information, and is intended to act as a comparison with FIG. 3 discussed above. In the process illustrated in FIG. 4, following receipt in step 1 at the Forwarding Processor of a notification packet which needs to be disseminated and processed, the FP notification packet is forwarded directly in step 2 to the other FPs, in this illustration bypassing the CP entirely. This is in contrast to FIG. 3, where the notification packet is forwarded to the other FPs only after processing by the CP.

Around the same time as forwarding the notification packet is forwarded to the other FPs (and hence also indicated as being step 2 in FIG. 4), the notification packet is flooded to other routers by the first FP and other FPs that are in receipt of the notification packet from the first FP. This ensures very rapid dissemination of the critical information in the notification packet. Local internal reconfiguration of the FP can also be performed rapidly.

Only then is the notification packet forwarded in step 3 up to the CP for processing in step 4. Following that, the CP processes the notification packet in step 4 and then arranges for any configuration of the FPs required by the notification packet. It is to be noted that step 4 (i.e. the mere sending of the notification packet to the CP) can happen concurrently with or even before step 2, so long as processing by the CP does not delay step 2. Step 2 can happen at least partly in parallel with step 3 and/or 4, but for any benefit to be achieved by the present invention step 2 must be complete before step 4 does (or at least before the result of the processing is notified to the FPs or before any resulting reconfiguration of the FPs is arranged or performed).

In a router, the control plane processor/card (CP) runs the well known routing protocols and calculates the necessary information for forwarding (routing table). An optimised variant of the routing table (i.e. the forwarding table) is then downloaded to the linecards (forwarding engine, forwarding processor, data plane, FP, etc.). The linecard using this information can forward packets in an efficient and quick way to guarantee the line speeds required.

A single router may incorporate several linecards (several FPs). A packet coming in on one FP may be forwarded using another port on the same FP or onto another FP. A router could operate with a single linecard.

Steps performed in each forwarding engine (FP) are illustrated schematically in FIG. 5.

Referring to step A, the incoming trigger may be a received fast notification message (remote event) or the trigger may be the detection of a local event. If the trigger is a message, the message header will be the hint that a fast path notification has arrived (e.g. special multicast destination address and/or special IP protocol field). Either a local event or the remote notification case requires the information to be rapidly forwarded to the rest of the network.

Referring to step B, in each hop the primary task is to propagate the notification further to selected neighbours. Within the node, this task is based on multicast; that is, the packet needs to be multicasted to a selected set of neighbours (see next chapter about details).

Referring to step C, processing of the notification is begun within the linecard if the router is subscribed for this notification and if the FP is prepared for making forwarding configuration changes. (For instance, the reaction to a notification indicating a remote failure may be the reconfiguration of the forwarding table.)

Referring to step D, if the node is subscribed to the notification, it is sent to the control plane, which can run its own process. For instance, it may reconfigure itself or it may undo the forwarding configuration changes made within the linecard.

An important use-case of FPN is to advertise failures in the network. An embodiment of the present invention works out the details of how FPN should be used to distribute failure advertisements and how nodes should process the received notifications. The FPN concept as set out in PCT Patent Application No. PCT/EP2010/059391 describes, generally, how any notification should be distributed. FPN proposes three different distribution alternatives:

Spanning-tree mode: nodes consistently agree on a single distribution tree reaching each node in the area. The spanning tree mode has the advantage of simplicity. Its drawback is that if a link fails, where the link is on the spanning tree, it will cut the spanning tree. The same happens if a node fails, given that each node is on the spanning tree by definition.

Redundant-tree mode: nodes in the area consistently agree and setup a pair of so called redundant trees. A pair of redundant trees guarantees that even after ANY single node or single link failure each node can reach the common root of both trees at least along one of the trees. Consequently, this means that even in the presence of any single failure, each notification can reach the root node, which can then forward the notification to each other node.

Flooding-mode: each node multicasts the received notifications to each of its neighbours except to the one from where it was received. This method guarantees that any notification reaches each other node even despite of multiple failures—as long as a path can be found. This mode requires duplicate check to be performed in the linecard.

It is desirable to provide a solution that:
does not rely on tunnelling;
does not rely on interface-specific forwarding;
does not assume any bits available in user IP packets to do packet marking;
keeps any processing at fail-over in the forwarding engine (linecard) to guarantee rapidity For this purpose an embodiment of the present invention builds upon the Fast Path Notification (FPN) service. However, although FPN is a good mechanism to be used to distribute failure notifications, it is to be appreciated that the present invention is not limited to using FPN for failure notifications. The forwarding configuration within the FPs (within the linecards) is updated as a reaction to receiving such a notification. The alternative forwarding configuration is pre-calculated and pre-downloaded by the control plane processor to the forwarding engine in preparation for local and remote failures as necessary.

Figure 6:
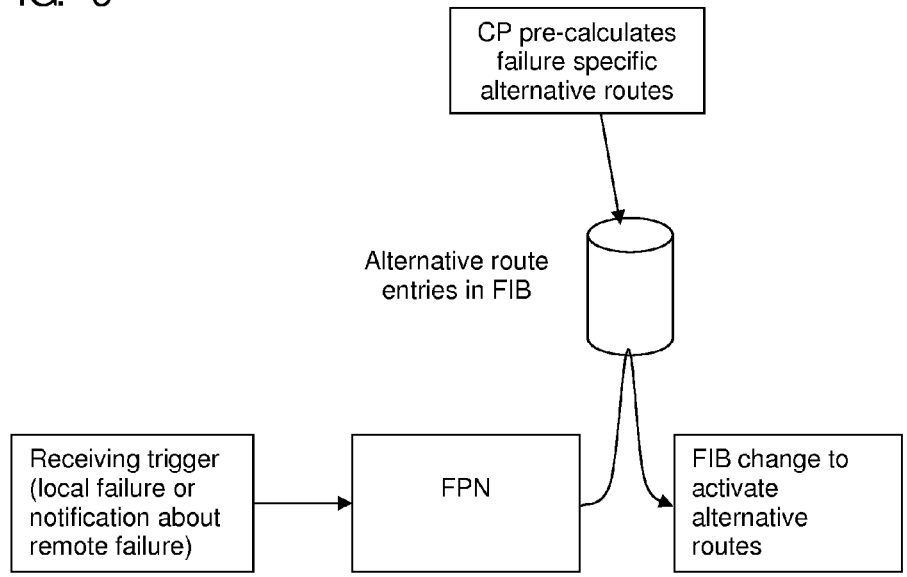
FIG. 6 is for use in explaining an embodiment of the present invention.

An overview is provided in FIG. 6, though again it will be noted that the use of FPN in an embodiment of the present invention is not essential.

The incoming trigger may be a received fast notification message (remote failure) or the trigger may be the detection of a local failure event. If a local failure has been detected, a notification packet is assembled containing the identity of the connection which has failed. Then the FPN service is used to distribute this notification to the rest of the area.

Nodes receiving the notification initiate a procedure to activate the alternative routes specific to the failure: the forwarding engine itself performs the reconfiguration. The procedure can be to immediately start and switch the necessary forwarding entries. Alternatively, when a packet is forwarded, the forwarding engine can check if the active route is coherent with the known failures. If not, that specific route entry is updated.

A protection technique is provided for IP networks, capable of rerouting packets rapidly in the case of a failure. Although there are several such proposals (these schemes are called IPFRR techniques), all of them have serious drawbacks as discussed above. These drawbacks stem from the fact that these techniques are based on two principles: packets must be rerouted locally to some precomputed detours.

In order to provide local rerouting (when only the neighbours of the failed resource "know" the failure), some marking is needed. However, observe that the propagation time of the failure notification is not a real bottleneck when Fast Path Notification (FPN) is used. Thus, a proposal according to an embodiment of the present invention, referred to herein as FPN Based FRR (FBF), gives up local rerouting, and utilizes FPN for protection purposes.

However, observe that although propagating the information about a failure is not a bottleneck, communication with CP and computation after a failure must be avoided. Therefore, FBF still precomputes the next hops, and downloads all of them to the FPs, which can autonomously switch to an alternate next hop immediately without the need of time consuming CP interaction. In the followings, we exactly describe this scheme.

For simplicity, first it is supposed that each link is in exactly one Shared Risk Link Group (SRLG). Each link is at least part of an SRLG consisting of only the link itself (both directions). In other cases, an SRLG may consist of multiple different links (but each link is still in one SRLG only). The extended case, when links are allowed to be assigned to multiple SRLGs, is described thereafter.

The next part of the description is divided into the following sections: (1) failure detection; (2) dissemination of the failure notification using FPN; (3) preparation for failures; and (4) reaction to a failure.

Failure detection will now be described (section 1 mentioned above).

First consider the case that the network is intact and is in a stable state. When a failure shows up the first task is to detect it. This can be realized in multiple ways. This is generally known and for the purpose of the present invention it is assumed that a fast failure detection mechanism can be used.

The simplest is to rely on some extra information of a lower network layer, e.g., the physical layer can detect the loss of voltage or loss of signal. However, this failure detection cannot be applied for non-physical point-to-point links. In this case some fast hello protocol can be used, like Bidirectional Forwarding Detection (BFD). Using BFD, failure detection can be realized in 10-20 ms at most.

Note, however, that when a node detects in either way that a connection to one of its peers has gone down, it cannot be sure whether it is a link failure or whether the peer node itself went down.

Dissemination of the failure notification using FPN will now be described (section 2 mentioned above).

As it was discussed above, FBF is not based on local rerouting, instead it advertises the fact that a failure occurred. Therefore, the way of propagating this information is an essential part of the mechanism. This invention proposes to advertise failures using FPN and so to perform fast rerouting in case of "down" events in remote nodes. However, this invention assumes that "up" events (e.g. a link seems to be connected again) are not advertised with FPN, or at least that IPFRR is not subscribed to "up" advertisements. Once the forwarding engine performed re-routing based on a failure notification ("down" event), it is the responsibility of a control plane protocol (e.g. IGP) to re-configure the forwarding engine, should the failure be corrected.

The generic FPN concept as set out in PCT Patent Application No. PCT/EP2010/059391 defines notifications with the following format:

Resource ID: a key uniquely identifying a resource in the network about which the notification contains information Instance ID: this field is responsible to identify a specific instance of the notification. In general for the same resource, multiple notifications may be sent after each other, hence nodes might need to know which information is the most recent. This field may be a timestamp set at the originator or a sequence number.

Event code: this field is responsible for disclosing what has happened to the element identified by the above Resource ID.

Info field: this field may contain further data, depending on the application of the FPN service. It may be empty if not needed.

In general, the source IP address is set to the address of the node originating the information. The destination IP address is set to MC-FPN, i.e. to the multicast group address of FPN, which is known by each node.

An embodiment of the present invention specifies these fields for this specific IPFRR application.

The source IP address is set to the data plane entity's interface address originating the information (i.e. detecting the failure). This not only identifies the originator node but also the specific interface on the node.

Resource ID is set to the identifier of the neighbour with which the connection was lost.

Instance ID is not needed (not used) by an embodiment of this invention, since it is supposed that IGP convergence takes place after fast rerouting. Hence, another notification about the same resource takes place only after the control plane, i.e. the IGP, has finished processing the first event. That is, if a resource went down, it is considered down, till IGP does not change its state).

The Info field identifies the SRLG that has failed.

Event code either shall contain a well-known code that means "failure" for every recipient or shall not be used, since we only advertise failures as it was mentioned above.

The FPN concept as set out in PCT Patent Application No. PCT/EP2010/059391 describes three different modes for distributing the information (as briefly summarised above). It is important to mention, since the CP is excluded from FPN (CP can be noticed that an FPN notification was received, but only after it was further propagated and processed by the linecard. Thus, FPN is processed without the CP, and the FP receiving the FPN packet must notify other FPs in the same node), that FPN takes care of passing the notification to all FPs in a single node (even if that FP is not needed for multicasting the notification to the selected neighbours).

The simplest mode of FPN operation is to build a sole spanning tree as a bidirectional multicast tree, and if a failure shows up, the notification can be propagated along this tree. Naturally, a failure may partition the spanning tree into some disjoint components. However, observe that if only a single link failure cuts the tree into two, there is an endpoint of the link in both components, and they can notify other nodes in the same part of the tree. In this way, a notification describing the failure can be propagated in both of the two components, and all the nodes can be notified.

Figure 9:
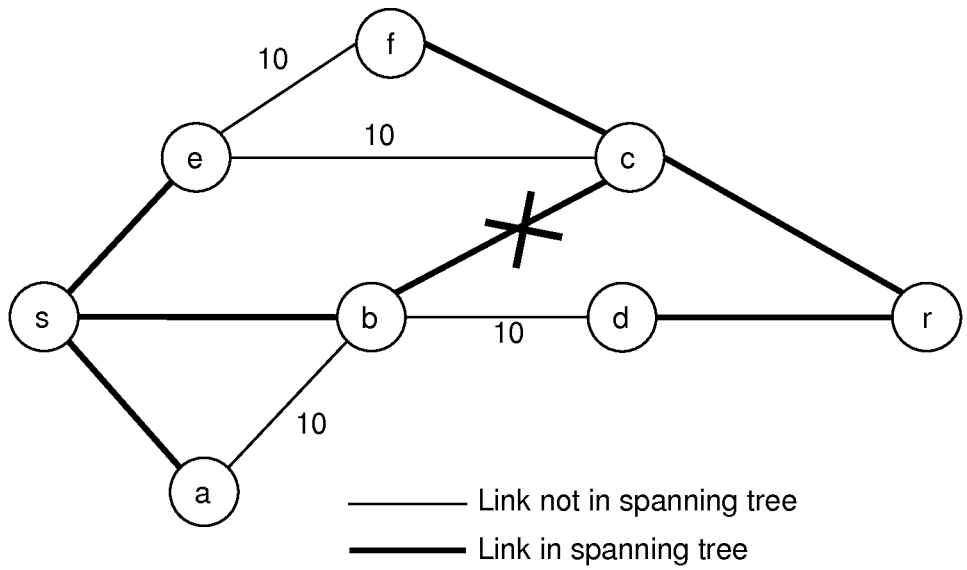
FIG. 9 illustrates a sample network with a single spanning tree (denoted by bold lines); the cost of the links in the tree is 1, all the other link costs are 10.

As an example consider the network depicted in FIG. 9, and suppose that link b-c goes down, which splits the spanning tree into two. However, there will be a notification describing the failure in both parts of the tree, in one of the parts the notification will be originated by node b, and in the other part, it will be originated by node c. In this way, packets sent by s to d can be rerouted to path s-e-c-r-d.

However, this simple approach has some drawbacks too. If not a single link fails, but a node or an SRLG, the spanning tree can be split into more than two components, and not all the notifications will be received by all the nodes. This can cause a problem, since in this way differentiate the failure types is not possible, e.g. nodes cannot distinguish between SRLG and a node failures.

Figure 10:
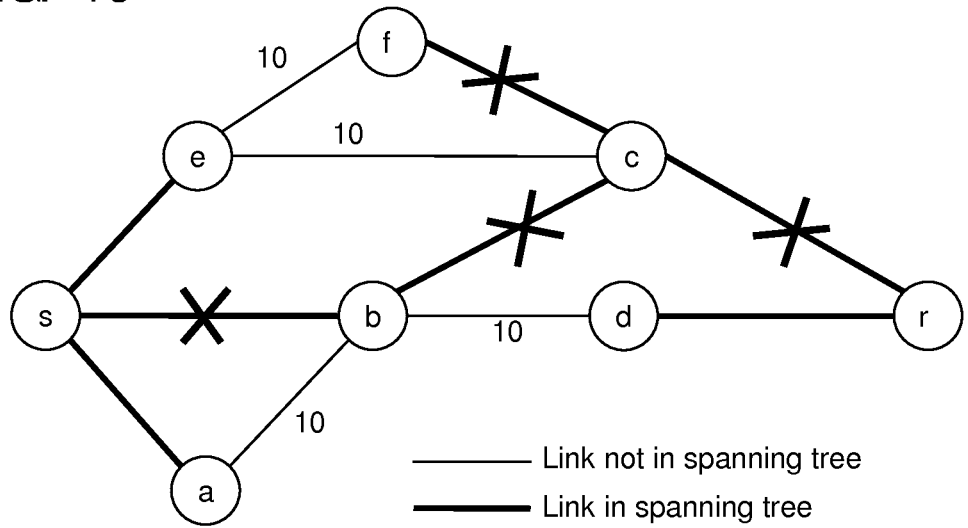
FIG. 10 illustrates a sample network with a Shared Risk Link Group (SRLG) failure.

The problem is demonstrated in FIG. 10, where now not link b-c fails, but an SRLG containing s-b, b-c, c-f and c-r. In this way, s has no chance to decide, whether the SRLG or node b went down, albeit it would be essential for choosing either a or e as a new next hop towards d. Observe that choosing the wrong next hop at s towards d would result failing to reach d.

If it is supposed that each link can be in at most one SRLG, redundant trees can help to overcome this problem, which is the second propagation mode of FPN. As it was mentioned above, a pair of redundant trees is a pair of such spanning trees that their common "root" node can be reached from each of the nodes along at least one of the trees after any single link or node failure. Since the root can be reached, and the root can reach all the nodes, if the root replicates the notification received on one tree, and sends it on the other tree, all the nodes receive all the notifications. Unfortunately, there are still some problems: SRLGs can still split both of trees into two, the root can fail and redundant trees can be found only in 2-node-connected networks.

In order to solve the SRLG problem, observe that even if not all the notifications are received, now it is possible to distinguish between SRLG and node failures. If a node loses connectivity with another one, nodes having received its notification can first suppose SRLG failure (recall that we suppose that each link is in exactly one SRLG). If, however, this assumption was not correct, if there was a node failure, all the notifications will be received, and each of the nodes can switch to a node bypassing path.

In order to handle the case when the root fails, a carefully chosen pair of redundant trees is needed, such that in one of the trees the root has only one neighbour; thus this tree remains connected after the failure of the root, and all the notifications will be received on this tree. Fortunately, several algorithms for finding redundant trees finds such special pair of trees as a "side effect" (e.g. [Gábor Enyedi, Péter Szilágyi, Gábor Rétvári, András Császár, "IP Fast ReRoute: Lightweight Not-Via without Additional Addresses", IEEE INFOCOM-MiniConference, Rio de Janeiro, Brazil, 2009]). This is illustrated in FIG. 11.

Finally, when the network is not 2-node-connected, it is still possible to find a pair of redundant trees in each of its 2-node-connected components. Alternatively, it is possible to use maximally redundant trees [Gábor Enyedi, Gábor Rétvári, András Császár, "On Finding Maximally Redundant Trees in Strictly Linear Time", IEEE Symposium on Computers and Communications (ISCC), 2009] [Gábor Enyedi, Gábor Rétvári, "Finding Multiple Maximally Redundant Trees in Linear Time", available online: http://opti.tmit.bme.hu/~enyedi/PhD/distMaxRedTree.pdf, Submitted to Periodica Polytechnica Electrical Engineering 2010], which can be found in any connected network. Maximally redundant trees are such spanning trees that the paths towards the root contains only the unavoidable cut-nodes and cut-links; the root remains reachable along at least one of the trees, in the case of a single node or link failure, if the network remains connected. Naturally, the algorithms in the two Gábor Enyedi references noted just above find such maximally redundant trees, where the root has only one neighbour in one of the trees.

Figure 11:
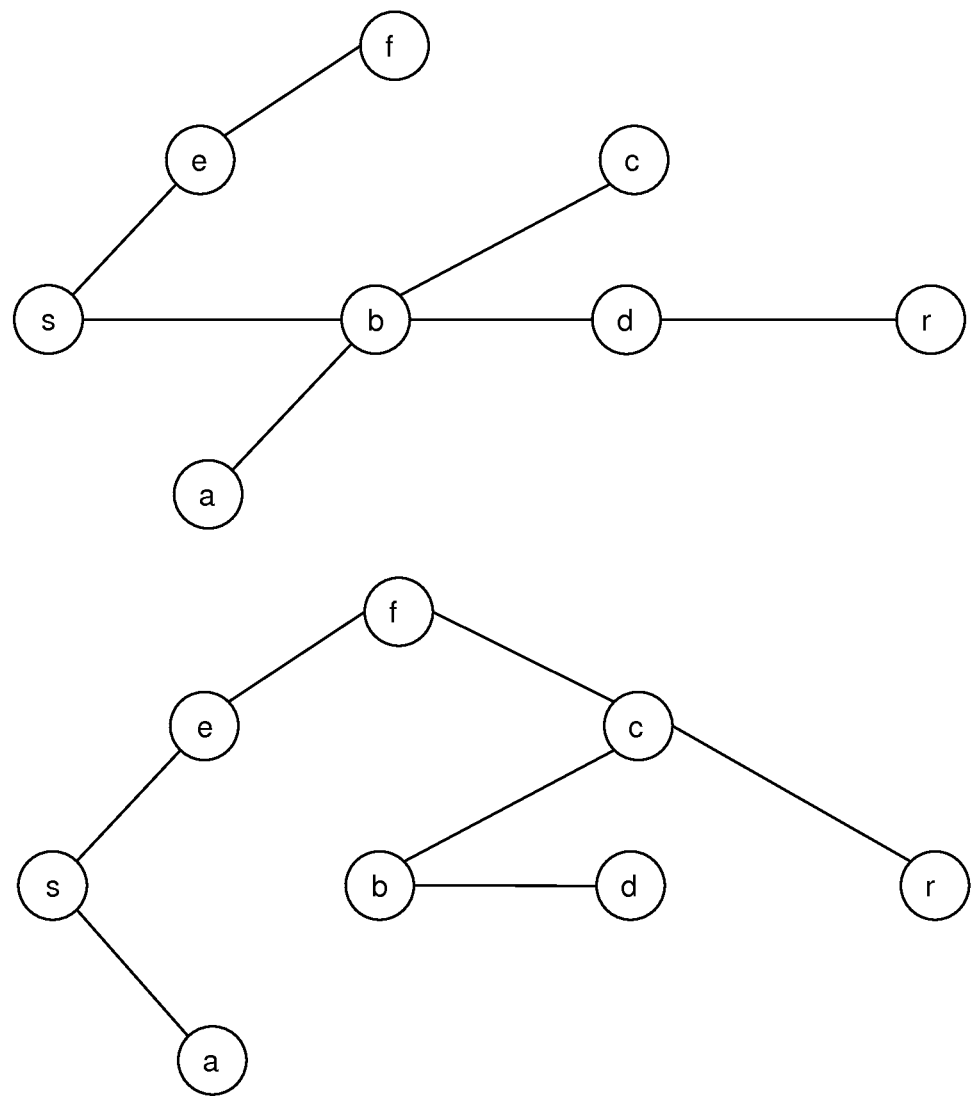
FIG. 11 illustrates a pair of redundant trees rooted at r.

As an example, consider the same network and SRLG failure as previously (FIG. 10), and suppose that the redundant trees are the ones depicted in FIG. 11 (the root is now node r). When s detects the loss of connectivity with b, it immediately supposes that the SRLG is down, and sends packets to a. Since a receives notifications from b and r along the first tree and from f and s along the second tree, so supposes SRLG failure (in this special case, a knows all the failures, but it would chose SRLG too, even if it had not been the case) and sends packets to b, which forwards them to d. Observe that s did not knew all the failures, but selected the right next hop.

If, however, the first assumption of s was wrong, and not the SRLG, but b went down, s receives notifications from a, c and d on the second tree, and can deduce that packets must be rerouted to e. Observe that s got the notification of d, since it was able to reach r along the first tree, and it was replicated to the second tree.

The disadvantage of this solution is that if links can be in multiple SRLGs, the lack of receiving some notifications may result the fail of rerouting. Suppose that the SRLG 1 contains b-s, c-f, b-c and c-r, while SRLG 2 contains b-s, c-f, b-c and b-d. In this case s do not receive notifications from b, c, d and r, thus it cannot decide, whether forwarding to e or a is the right choice.

Receiving all the notifications can be realized by flooding the packets to all the nodes, which is the third propagation mode of FPN. Moreover, flooding can help to detect the case, when multiple unrelated failures occurs, in this way allowing to fall back to traditional recovery rapidly. However, the drawback of flooding is that packets can be received in multiple paths, thus it needs duplicate check.

Preparation for failures will now be described (section 3 mentioned above).

This section describes the details how the control plane pre-calculates the alternative routes for different failures and how this information is downloaded and stored in the forwarding engine.

Precomputing and storing the next hops on the new shortest paths for all the possible single failures may seem complex, however, as it will turn out, it is not so difficult to realize. First, observe that this precomputation can be done "offline", while the network is intact and the CP has few things to do. Second, for a single node, it is not needed to compute all the shortest paths with respect to any possible failures; only those link failures are needed to be taken into consideration, which are in the shortest path tree starting from the node.

Therefore, as the first step, the CP computes all the shortest paths for all possible single SRLG and single node failure cases (recall that we suppose that each link is in exactly one SRLG. Thus, by computing the detours for SRLG failures describes single link failures as well).

The idea here is that once a failure notification is received that a connection from a node A to a node B went down, the recipient node first assumes that it is an SRLG failure. If forthcoming notifications confirm this, i.e. more notifications are received from the same SRLG, then the decision is OK. However, if a new notification is received outside the SRLG but the notifications still match a failure of node B, then the recipient will change its forwarding entry from the SRLG-protecting next-hop to the node-protecting next-hop. If it is possible to calculate in advance a backup route that protects both the node and the SRLG failure at the same time, then the CP will install the same entry for both cases.

In order to store all the information needed, in the simplest case, FBF keeps up two arrays. One of them is the SRLG array which contains the routes (next-hops) for SRLG failures, the other one contains the routes for node failures.

If a network area contains V vertices (nodes) and S SRLGs, then SRLG array stores V*S entries, while node array contains $V^2$ entries: x-coordinate is the destination node ID, y-coordinate is the failure ID. Supposing that a next hop can be described by 4 bytes, SRLG array would need at most $4*V^3$ bytes, while node array would need $4*V^2$ bytes. Supposing that the OSPF area contains not more than 200 nodes, about 30 MB memory is needed for the arrays. Considering that, as it will turn out, this information can be completely stored in some slow Dynamic Random Access Memory (DRAM), and that linecards of recent routers typically have 0.5-2 GB DRAM, providing this amount of free memory can be acceptable. If not, another solution discussed later can be applied.

Figure 12:
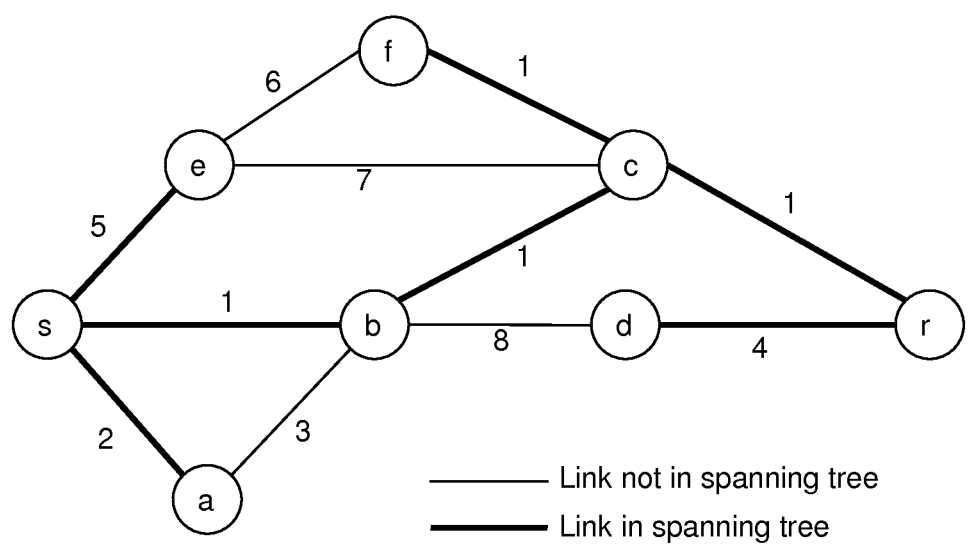
FIG. 12 illustrates a sample network; numbers next to edges denote the identifier of SRLG containing the link; the cost is 1 for bold edges and 10 for solid edges.

As an example, consider the previous network depicted in FIG. 12, where the numbers next to the edges describe SRLGs containing the edge. As it can be observed, each link is in exactly one SRLG. Most of them is the sole link in the particular SRLG, except the links b-s, b-c, c-e and c-r, which make up SRLG1 (this SRLG fails in FIG. 10). The tables in FIGS. 13 and 14 show the SRLG array and the node array respectively.

The advantage of this approach is that if node IDs and failure IDs are numbers from 0 to (V−1), then when an entry is needed from this table, no search operation has to be performed, the backup entry can be directly addressed.

According to Hokelek et al (referenced above), most failures influence next hops in a very limited radius, we expect that only few SRLG or node failures have an impact on the route to any destination (e.g. 2-3 at most). Thus, another type of array implementation can be less memory-consuming, as will now be described.

In this case, the SRLG and node array shall contain pointers to lists (these lists are not linked lists but arrays; we call them lists, since the length of two lists is not necessarily the same) with varying length for each destination. These lists contain {SRLG ID, next hop ID} pairs for all the SRLGs influencing the path of the prefix. Similarly, the other list contains {node ID, next hop ID} for all the nodes, the failure of which may change the next hop of the prefix. Observe that SRLG lists need much less memory even in worst case scenario; since any path can contain at most V−1 links, SRLG lists can contain at most $(V-1)^2$ entries (there is no prefix for the node itself) just as node failure lists. Hence, supposing that both an SRLG ID and a node ID take at most 4 bytes (which is not hard to suppose since an IPv4 address is 4 bytes long), all the entries would take about $2*8*(V-1)^2$ bytes. Some memory is needed for the pointers in the SRLG and node array, this needs 4*(V−1) bytes, if a sole pointer takes 4 bytes. Supposing that V=200, now at most about 634 KB is needed. Moreover, if we suppose that observations in Hokelek et al [referenced above] are correct at least in average, and suppose that there are three entries for each prefix, the alternative next hops would take about 10 KB at most. Finding such an amount of free memory in a linecard with 0.5-2 GB DRAM must be possible.

Observe that in the case of a failure, finding some elements in an SRLG or a node list is needed. Therefore, the elements in these lists should be ordered with respect to the SRLG ID or node ID respectively, in order to make it possible to use efficient search algorithms (e.g. binary search).

SRLG lists and node lists for node s are presented in the Tables of FIGS. 15 and 16 respectively.

Reaction to failures will now be described (section 4 mentioned above).

This section describes how a node, or more specifically a forwarding engine or FP, reacts once it learns about a local or remote failure via local failure detection or via FPN.

First, the collecting of known failures will be discussed.

The fact that a failure occurred must be stored in a list containing the known failures and the supposed reason (which resource was lost), and switching to a safe configuration (described later) can be done. This is a simple array containing the SRLG ID of the failed link and the ID of the node with which the connection was lost. We call this array the "KnownFailureTable". Note that we suppose that this list is empty in a stable, failure-free state, thus there are entries only while fast rerouting keeps up the connection, and IGP clears the list, when reconfiguration is done. Thus, this list would typically be quite short, containing only few entries. Moreover, since this list is short, it can be kept completely in a fast memory, like Static Random Access Memory (SRAM). Besides storing KnownFailureTable in a fast RAM, it is proposed to store it in a fast RAM that is shared among the cores/processors of the forwarding engine.

First suppose that the KnownFailureTable is empty and either a local failure shows up or an FPN notification arrives. In this case the FP adds an entry to KnownFailureTable. Next, it is decided whether an SRLG or a node failure happened.

Since link failures are much more common than node failures [A. Markopoulou, G. Iannaccone, S. Bhattacharyya, C. Chuah, and C. Diot, "Characterization of failures in an IP backbone", In IEEE Infocom, 2004], FBF first assumes SRLG failure. Forwarding reconfiguration can commence as described in the next section.

If the KnownFailureTable already contains elements when the FP is notified about a (local or remote) failure, it compares the SRLG ID of the new failure with the entries found in the table. If a new single failure is learnt of the same SRLG, then the entry is simply added to the list but forwarding reconfiguration is not needed as it was performed before.

However, when a notification contains an SRLG ID different from the value(s) stored in the KnownFailureTable, the FP must assume node failure instead of SRLG failure and forwarding reconfiguration can commence as described in the next section.

After performing the forwarding configuration change, the hypothesis that a node failure happened should be verified by comparing the second fields in the stored entries with the ID of the node with which the connection was lost in the new notification. If all match, the failure is a node failure, so the initial decision was correct and no time was lost with verification before the configuration change.

If neither the SRLG IDs match, nor the node IDs match, there are multiple unrelated failures in the network, which is not handled directly by FBF (though see further below), so the CP is immediately informed, and the failure is handled by traditional restoration, like OSPF or ISIS.

Figures 17, 18, 19:
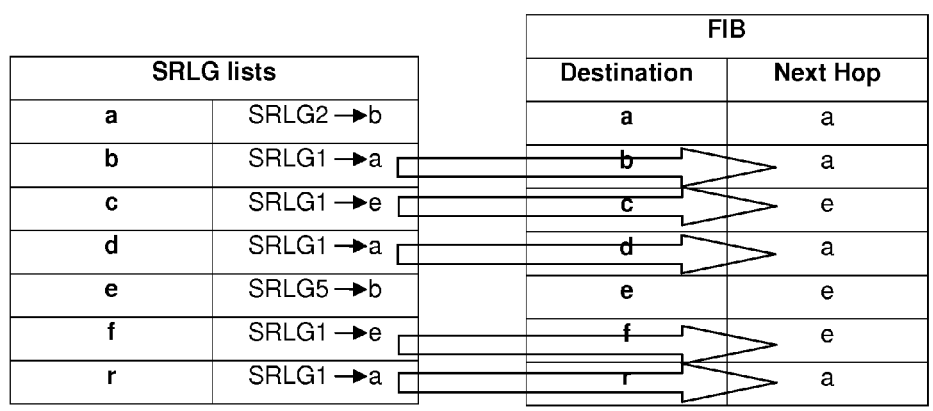
FIG. 17 illustrates the "KnownFailureTable" of node s, when SRLG1 fails (FIG. 12); the notifications were originated by s and f.
FIG. 18 illustrates the "KnownFailureTable" of node s, when node b went down (FIG. 12); the notifications were originated by s, a, d and c.
FIG. 19 illustrates the updating of corresponding entries with a greedy manner in node s (FIG. 12), after SRLG1 has failed.

As an example, the KnownFailureTables of node s (FIG. 12) is presented in the Tables of FIGS. 17 and 18. Observe that in the first case node s did not receive all the notifications. However, since it supposes SRLG failure, while the opposite is not apparent, the assumption is correct. On the other hand, when node b fails, node s gets all the notifications on at least one of the trees, so it finds out that the first assumption (SRLG1) is not correct, when it receives the notification of a, which contains SRLG3 and node b.

Secondly, finding the new next hop will be discussed.

After the type of the failure was selected (SRLG or node), the entry describing the alternative next hop needs to be found.

As discussed above, the method selects a destination to be updated, then depending on the array type directly addresses the backup next-hop with the SRLG ID or the node ID. If the compact-memory implementation was used for the SRLGArray and the NodeArray (FIGS. 15 and 16), after selecting the correct row based on the destination, the method performs a search operation in the list for the entry with the given SRLG/node ID. If the arrays contain entries sorted with respect to the ID of the failed SRLG/node, this can be realized with binary search.

Thirdly, a "No FIB update" option will be discussed.

If alternative entries are stored in the first way, i.e. when no lists are applied, and all the next hops are in an array with two dimensions (FIGS. 13 and 14), it is possible to use the SRLG and the node array for each FIB lookup that is required. In this case the result of a FIB lookup would be an offset, which shows the corresponding column in the SRLG and node array (observe that there are the same columns in both arrays), and the row is identified by the failure. In this way a single additional memory read would give the next hop.

Fourthly, a "Greedy FIB Update" option will be discussed, with reference to FIG. 19.

The simplest way of changing the next hop when a failure notification is received is to immediately start updating the entries of the forwarding table one by one.

If the number of nodes in the network is low, this technique can update the FIB in 10 s of milliseconds.

Moreover, observe that most of the FIB entries do not need to be updated. In an operational router, many entries are provided by BGP (Border Gateway Protocol). BGP specifies the inter-domain next-hop to be used. This non-connected next-hop must be mapped to a direct intra-domain next-hop. Several routers use recursive lookup to resolve the non-connected next-hops of external prefixes. In such cases, only the intra-domain destinations need to be updated by IPFRR, as a result of which the same inter-domain next-hop will be reached through an alternative intra-domain next-hop temporarily.

Figure 20:
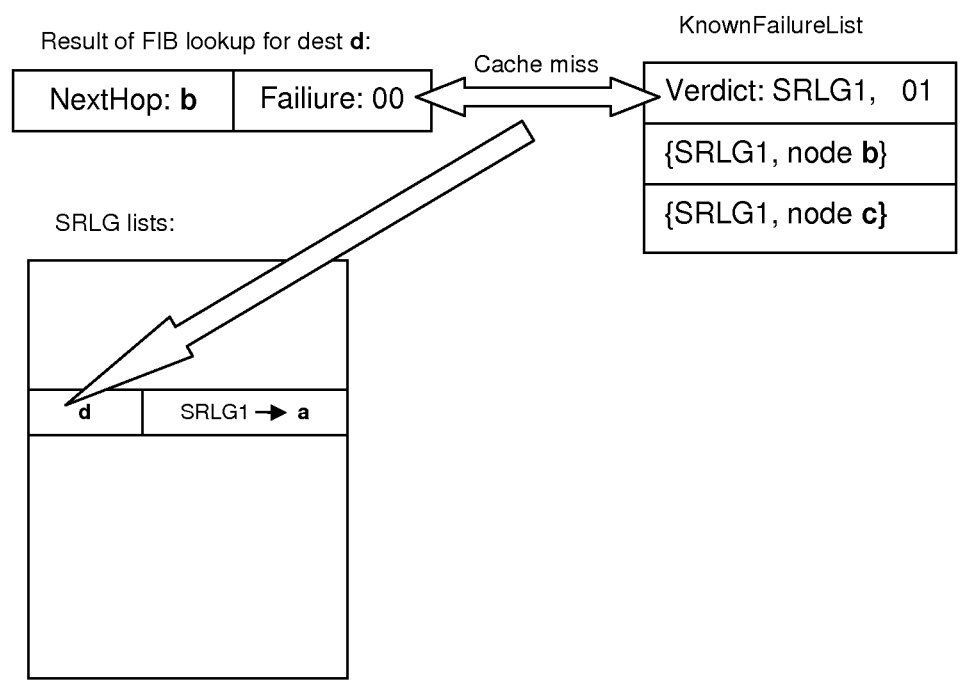
FIG. 20 illustrates a lazy update for destination d in the case of failure of SRLG1 in node s (FIG. 12)

Fifthly, a "Lazy FIB update" option will be discussed, with reference to FIG. 20. This option is also described further below with reference to FIGS. 7 and 8.

The "Lazy FIB update" option is arguably a better solution that the "Greedy FIB update" option. With the "Lazy FIB update", the failover can be performed in a distributed way, and the latency stemming from the need of updating the entries is shared between prefixes.

The main idea is that the forwarding entries are updated on demand. That is, when a packet needs to be forwarded to a certain destination, it queries the FIB about the next hop. However, before using that next-hop, the forwarding processor verifies if the next-hop reflects the correct failure state.

Therefore, we suppose that the result of a FIB lookup is not only a next hop, but it contains two extra bits too. These extra bits describe the three possible states of the next hop stored in the FIB (which is only a cache in this case), i.e. default next hop, next hop for an SRLG failure or next hop for a node failure. Extra bits can be either encoded into the next hop value returned from the FIB lookup (e.g., some router products return a 4 byte value as a result of the FIB lookup; naturally no router has 4 billion neighbours, so some bits can be used for other purposes), or the result of a FIB lookup can be a memory pointer, where not only the next hop but the two bits describing the current state of the next hop are found.

If the KnownFailureTable is empty and the value of the two bits is, e.g., 00, then the next hop contains the correct value (cache hit): the failure free default entry.

However, if a failure occurs, the entry becomes invalid, but the value will be updated when the first packet using the prefix arrives (cache miss). At this time, the KnownFailureTable will contain either SRLG failure (e.g. 01) or node failure (e.g. 10), but the forwarding entry still contains e.g. 00. From that, the processor sees that it has to update the entry from the respective table pinpointed by the failure type.

Moreover, each processor of the FP needs to know what the current failure state is, in order to compare it with the value stored for the forwarding entry. For this purpose some memory in a common fast RAM (e.g. SRAM) can be used, which can be checked for each packet. KnownFailureTable can be stored in this shared fast RAM, and it stores the current failure state (no failure, SRLG or node failure), and the data describing the failed resource (SRLG ID or node ID) as described above.

Observe that by using this cache, the delay stemming from the need of updating the cache is distributed: only the first packets heading to a given egress router gets some extra latency.

A simple example may be in order. Consider the network depicted in FIG. 12 and suppose that SRLG1 has failed. Suppose that a packet heading to egress router d arrives. When the FP starts processing the packet, it finds out that the next hop in the FIB is not valid (FIG. 20), since it contains the next hop for a failure free case, with code 00, which is node b, but the KnownFailureList contains a verdict that there is an SRLG failure in progress, i.e. code 01. Hence, the processing unit of the FP looks at the SRLG list to check whether there is entry for SRLG1. It finds an entry, which says that the next hop must be changed to node a (this is not an IP address, but a descriptor with a local significance). Then, the FP updates the FIB, and changes the failure code to 01 to indicate that now the entry is valid for an SRLG failure. If the destination of the packet had been node a or e, there would have been a similar check, however, no entry would have been found for the failure of SRLG1 in the SRLG list, and no update would have taken place.

Sixthly, "Combined FIB update" will be discussed.

Greedy and lazy updates do not exclude each other. When the type of a failure is changed, some processor(s) of the FP can start dealing with the FIB update immediately. When it finds a next hop, which is not valid, it can update it, while other entries can be updated in the lazy way, since during the update several packets can be forwarded by other cores/processors. Moreover, since greedy update can start updating the entries towards egress routers, packets get extremely low extra delay in this way.

Now, inter-working with LFA will be discussed.

The LFA mechanism is the simplest IPFRR solution. It can be used for many failures and it does not need cooperation from neighbour router. After a local failure, an LFA-capable node switches the route of the packets that would go through the failed connection to loop free alternate neighbours. Loop free alternate next-hops are those neighbours which, using their default forwarding configuration, i.e. default routes, can forward packets to the destination without going through the failure. As such, the information about the failure does not need to be communicated to loop free alternate next-hops.

A method embodying this invention needs to be used in those cases, when it is not possible to find local loop free alternate next-hops, i.e. when LFA does not work.

This means that nodes do not necessarily have to prepare and store alternative route entries for remote failures which can be handled by the node(s) adjacent to the failure using local LFA.

In this way, this method extends the failure coverage of LFA.

Now, Reverse Path Forwarding (RPF) check will be discussed.

Practically all vendors implement the capability to perform Reverse Path Forwarding check before forwarding a received packet. RPF check basically ensures that packets from fake addresses or incorrect directions are not forwarded. RPF check today checks on the route to the source address of the packet. If the nexthop is the same as one from which the packet came then RPF check succeeds. RPF can be selectively enabled/disabled.

In case of plain LFA, this traditional RPF check can easily render LFA useless, if enabled on the neighbour router used as LFA from a first router that detects a failure. The reason is that the neighbour router has different forwarding information, since it does not know about the failure.

If FPN is used to advertise failure information, each node has the same knowledge extremely quickly and so each node has the same forwarding information. As a result RPF check, after a failure notification, will compare the alternative reverse path.

Now, links in multiple SRLGs will be discussed.

So far, it was assumed that each link is in at most one SRLG. In this section, we discuss the possibilities if an operator wants to assign multiple SRLGs to certain links.

Figure 21:
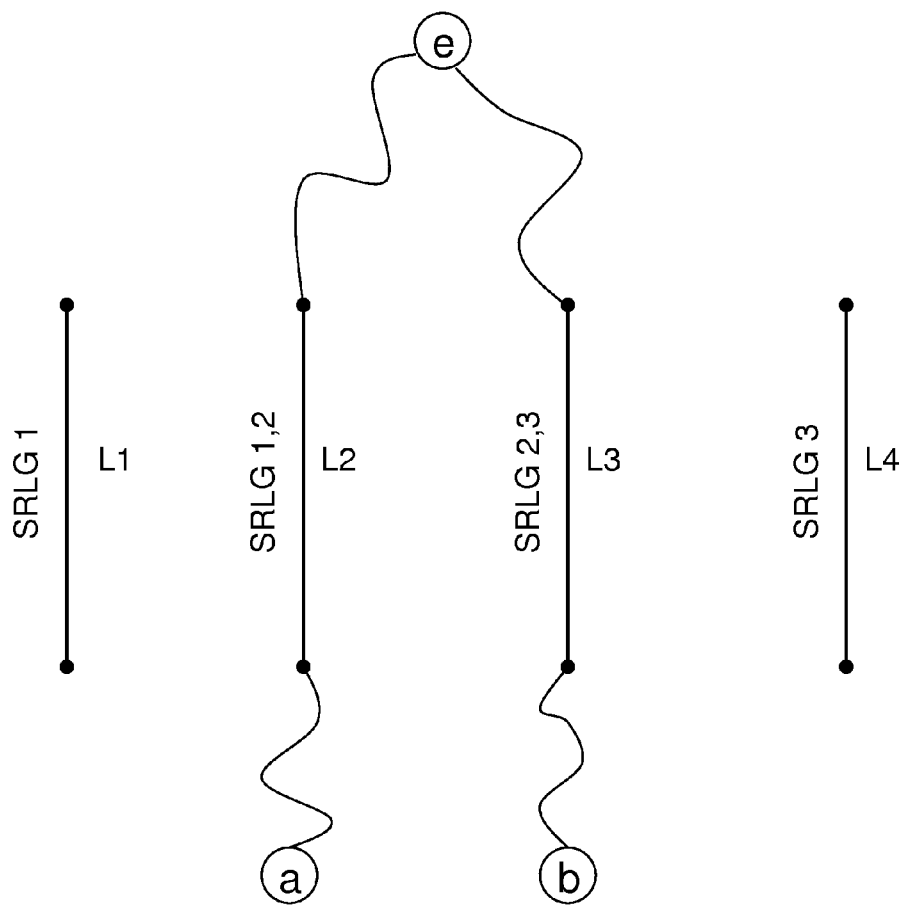
FIG. 21 illustrates a sample network.

First, consider the network depicted in FIG. 21, and suppose that there are packets to send to egress router e from both a and b. Moreover, suppose that there exists no path from a or b to e, which avoids all the three SRLGs, but it is possible to avoid any two of them. E.g. L4 can be used to avoid SRLG 1 and SRLG 2.

Figure 22:
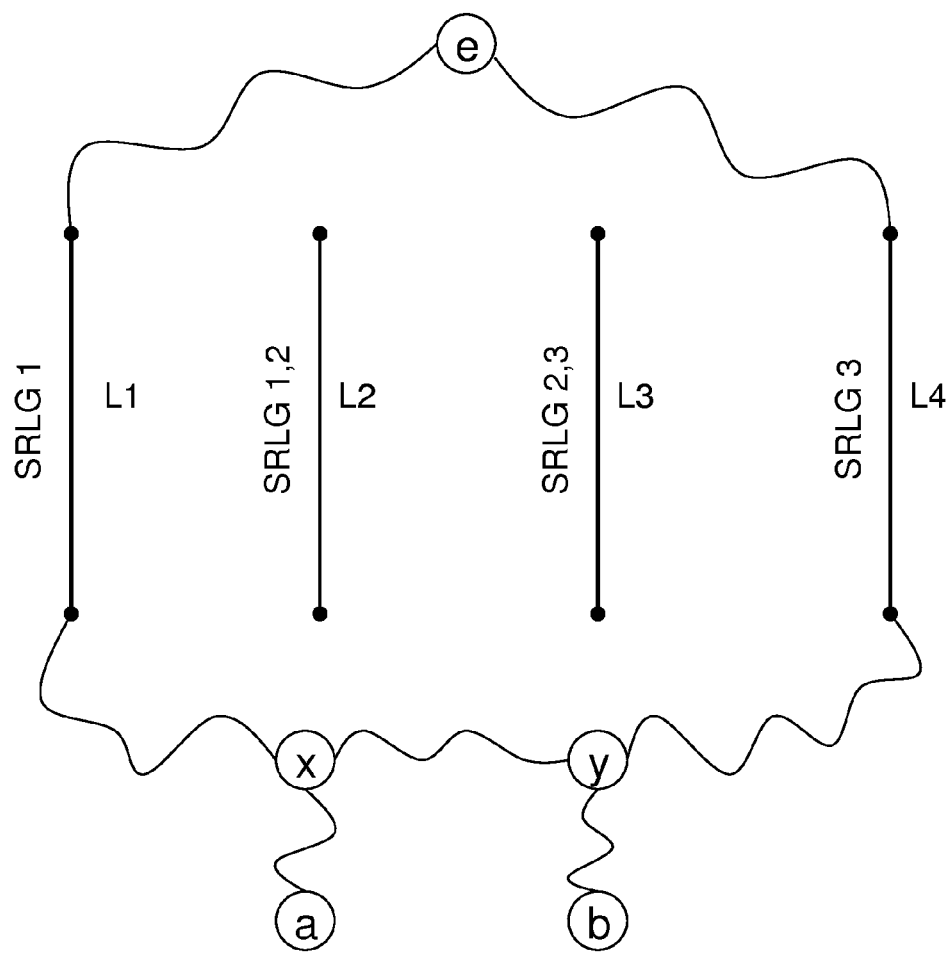
FIG. 22 illustrates MPLS protection paths.

If we have MPLS in this network, it is possible to pre-build the protection paths depicted in FIG. 22; protection against the failure of L2 means protection against SRLG1 and SRLG2, i.e. the protection path between a and e goes through x then y then L4, and the protection path between b and e (which should protect against the failure of SRLG 2 and 3 due to L3) goes through y then x then L1. However, observe that there is no way for pure IP to achieve the same behaviour: x, y and the nodes along the path between them cannot route packets heading to the same destination in two different ways. Destination-based IP forwarding cannot do this.

Still, it should be considered what to do if a received notification contains not only one, but multiple SRLGs. Note that we are still targeting the handling of single failures: single link, single node or single SRLG failures. Even if a link is assigned to multiple SRLGs, the IPFRR solution needs to protect against one at a time. It should be considered how to find out which SRLG has failed in reality.

There are two possibilities. In the first option, when a node gets notifications with different SRLGs, it computes the intersection of the SRLG lists contained in the notifications. In the sample network, let us assume that SRLG2 has failed in reality but the nodes receive two kinds of notifications: one listing SRLG1 and SRLG2, and the other containing SRLG2 and SRLG3. After taking the intersection, each node can deduce the same conclusion, namely that SRLG2 has failed in reality, so the backup next-hops should be selected as if SRLG2 had failed. Unfortunately, since this is a real-time task, computing the intersection can be too complex for certain hardware.

Thus, the preferred embodiment when dealing with links assigned to multiple SRLGs is computing "extended SRLGs". A link is a member of an extended SRLG, if one of its SRLGs contain a link in the extended SRLG (it is similar to transitive closure). Certainly, these extended SRLGs can be easily computed using recursion by the CP.

Back to our example, suppose that link L1 is in extended SRLG 1. Since L2 is in an SRLG, which contains a link in extended SRLG 1, L2 a member of extended SRLG 1 too. Now, L3 must be added to extended SRLG 1, since a link of SRLG 2 is already added. Finally, L4 becomes a member thanks to L3 and SRLG 3.

This way, when a notification about e.g. L1 is received, due the extended SRLG1, the control plane must have pre-calculated a backup route avoiding all four links shown. If there exists such a path, then the failure can be corrected, otherwise packets are discarded since no route would be found in this failure case. In this way the recovery falls back to traditional restoration by OSPF or ISIS.

Observe that in this second option avoiding all the single extended SRLGs is not always possible, albeit combinatorial explosion is avoided and operators can still configure SRLGs in the way as they get used to do.

Now, the issue of legacy routers will be discussed.

If there are legacy routers in the network, which do not support FPN-based fast rerouting, the situation is slightly complicated. We assume, however, as described in the FPN invention disclosure that legacy routers can propagate the notifications by manual configuring the forwarding rules of the MC-FPN multicast group. Legacy routers, however, cannot originate FPN notifications and cannot process these either. In this way, coverage clearly cannot be provided for all failures, e.g., a link between two legacy routers is not protected.

If, however, an FPN-capable node is connected to a legacy node, there is a good chance, depending on the network topology, that failures can be corrected. When calculating failure specific alternative routes, FBF capable nodes must consider legacy nodes as being fixed directed links (since legacy nodes do not change packet forwarding in the case of failure). As suggested in PCT Patent Application No. PCT/EP2010/059391, the FPN capability is advertised, so FPN/FBF capable routers can learn which other nodes are non-FPN capable.

Now, handling of multiple uncorrelated failures will be discussed.

Even though in general IPFRR does not target the protection of multiple uncorrelated failures, the solution presented in this invention offers this capability—at least in a limited manner depending on the processing/memory capacity of the hardware. While a few multiple-failure combinations carefully selected by the operator can be protected, in general protecting e.g. all potential double failure cases requires a quadratically scaling memory and processor.

However, for some special multiple failure cases the support could be the following. We only describe it for the support of a single double failure case. Let us assume we want to provide coverage for the concurrent failure of SRLG X and SRLG Y. All we need is to have a special new entry in the SRLG table: {SRLGX&SRLGY→a}. Similarly for double node failures, the node table should contain such "double" entries.

While there are various different options for implementing the here-presented solution according to an embodiment of the present invention, we attempt to identify the most promising combination of options that seems to offer the best trade-off with respect to efficiency and simplicity. This is not to imply that there are not potentially even more promising combinations.

Configuration of FPN that is most advantageous for fast re-route:

Redundant-tree mode (simple bidirectional multicast trees, can deal with simple SRLG failures, too)

Ensuring reliability with multiple sending instead of relying on acknowledgements (ease of implementation and guaranteed timeliness)

Giving priority to FPN packets (minimise loss)

In big networks FIB switch-over seems to be most efficient with the combined lazy and greedy updates. If the routing area is relatively small, greedy update is enough. Finding of the correct alternative next-hop can be based on SRLG list and node list (requires much less memory than the array based implementation, and despite the additional search operation, it is fast as searching is done in a relatively small list).

An embodiment of the present invention provides the capability of realising fast re-routing in IP. It does not suffer the drawbacks of previous solutions while it is able to offer complete single failure coverage. Hence it is practical to be implemented by vendors and used by operators. Besides, it offers some limited support even for correction against multiple uncorrelated failures.

It can be considered that the core of an embodiment of one aspect of the present invention is the "lazy FIB update" procedure set out above, and the preparation for failure handling with lazy FIB update and combined FIB update.

FIB update is to be performed after a router is, in some way, notified about a failure of the connectivity between two nodes. The type of notification used in an embodiment of the present invention is not important; FPN is one option, albeit a very good one. Another option is that there is a separate out-of-band control network where the notification is received. Even further, it is not strictly required that the notification is fast. Of course, for a practical usage, the faster, the better.

An embodiment of one aspect the present invention can be considered to relate to a linecard preparing for single node or single SRLG failures, the linecard receiving information about the loss of connectivity between two routers of the network, the linecard reacting to the failure by re-routing traffic to an operational path if needed by updating its FIB. The reaction can be considered to be as follows (in the alternative or in any combination):

1. The linecard stores "global" failure status information in a fast access memory
    a. Failure status information may include the type of the failure (SRLG or node) and the identity of the failed component.
2. Upon the reception of the failure information, the linecard changes the failure status in this fast memory as needed
    a. May decide that instead of an SRLG failure, a node failure happened and update the failure identity.
    b. If the failure state changes, the linecard may start (in the background) the greedy FIB update as described above.
3. The linecard storing a table of alternate routes that stores failure specific alternative routes for different destinations.
    a. The alternate routes table being organised as described in FIGS. 13 14.
    b. The alternate routes table being organised as described in FIGS. 15 and 16.
4. The linecard storing in the FIB, at each entry the type of the failure status at which that entry is valid.
5. The linecard, before forwarding a packet, doing a route lookup to fetch routing information from the slow memory to the fast memory, in the same step the linecard also fetching the failure status of the route without memory access overhead.
6. Comparing the global failure status information with obtained in the previous step.
7. If matching, forwarding the packet.
8. If not matching, the linecard performing an update of the entry based on the global failure status and the alternate routes table before forwarding the packet.
9. The reception of the information about the loss of connectivity between two routers of the network being performed using
    a. BFD
    b. L2 upcall
    c. FPN
    d. Out-of-band signalling network Another aspect of the present invention can be considered to relate to a control processor preparing for single node or single SRLG failures, the CP calculating failure specific alternate routes to different destinations and downloading these alternate routes to at least one linecard, characterised in that:

1. Extended SRLGs are calculated as described above; and/or
2. Sending its capability of performing the enhanced fast re-routing of this invention, and receiving similar information from other routers (the capability may be advertised in Opaque LSAs of OSPF); and/or
3. After learning the capabilities of other routers in the area, calculating the alternative routes anticipating that some routers not advertising their capability will not perform route changes as described above.

Figure 7:
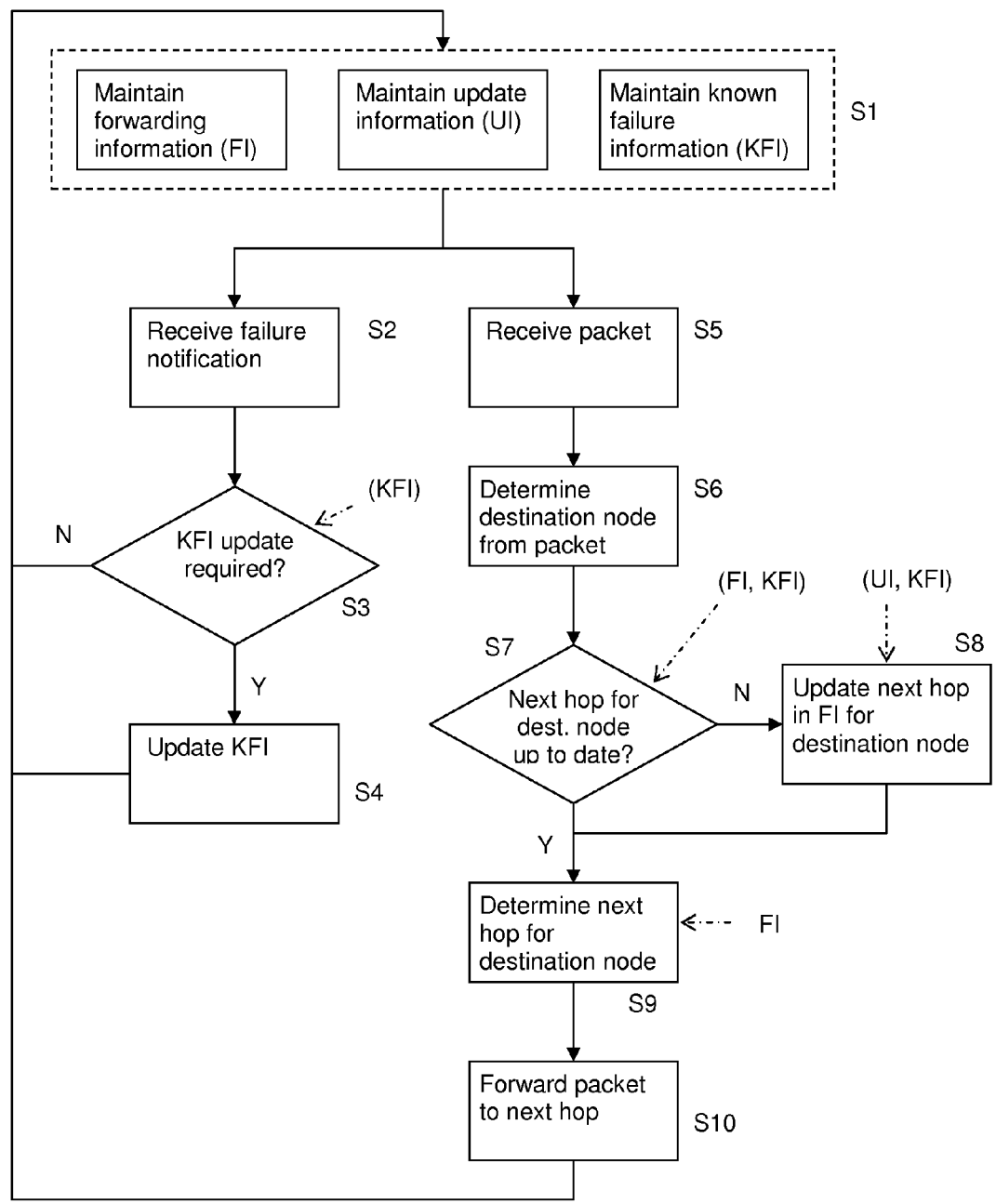
FIG. 7 is a schematic flow chart illustrating steps performed by an apparatus embodying the present invention.
Figure 8:
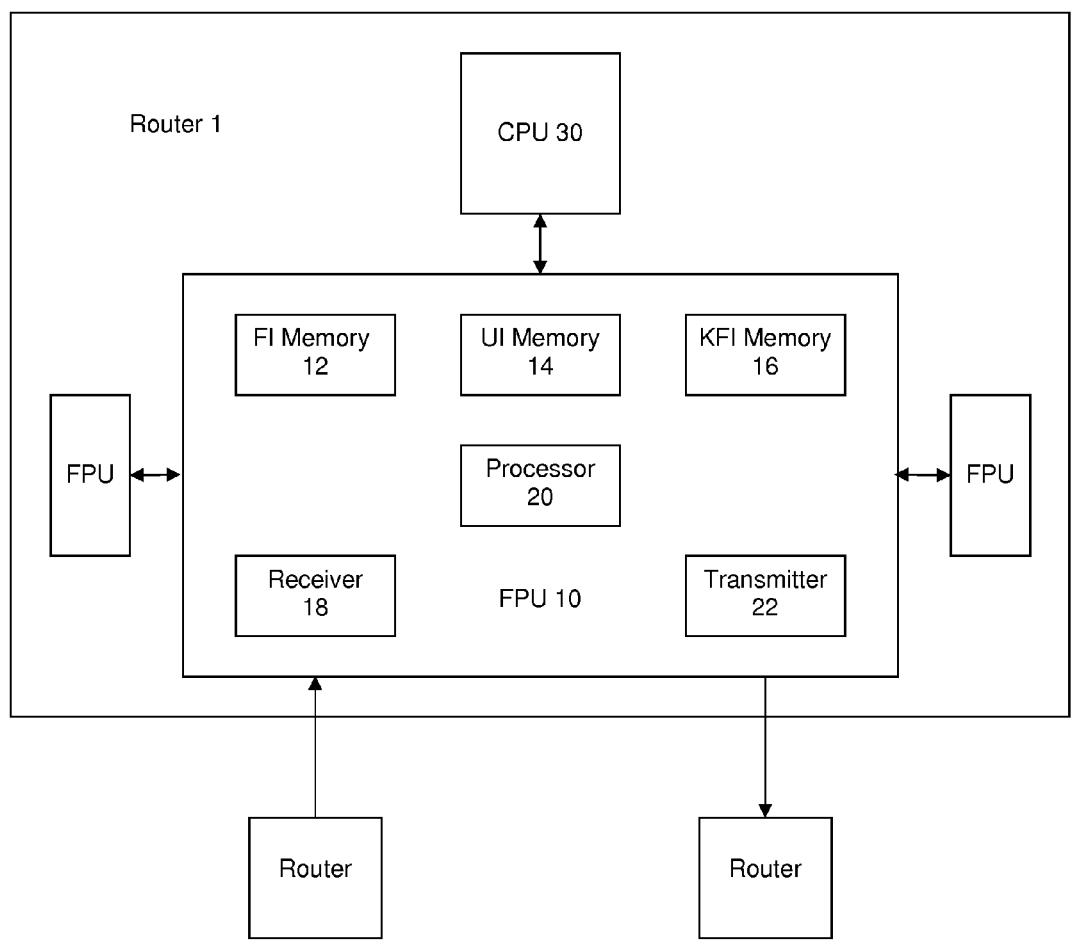
FIG. 8 is a schematic block diagram illustrating parts of an apparatus according to an embodiment of the present invention.

FIG. 7 is a schematic flow chart illustrating steps performed by an apparatus embodying the present invention, and FIG. 8 is a schematic block diagram illustrating parts of an apparatus for carrying out the method of FIG. 7.

A router 1 comprises a first processing unit (FPU) 10 and a second processing unit (CPU) 30. Three such first processing units are illustrated within the router 1, though the detail of only one of the first processing units is shown. Two other routers are also illustrated in FIG. 4, without any internal detail. The first processing unit 10 can be considered as being equivalent to a linecard or forwarding processor described elsewhere herein. The second processing unit 30 can be considered as being equivalent to a control card or control processor described elsewhere herein.

The first processing unit 10 comprises a forwarding information (FI) memory 12 which is used for maintaining forwarding information specifying the next hop node for each of a plurality of possible destination nodes. The first processing unit 10 also comprises an update information (UI) memory 14 which is used for maintaining update information specifying how, if at all, the next hop nodes specified in the forwarding information are to be updated for a plurality of possible network resource failures. The first processing unit 10 also comprises a known failure information (KFI) memory 16 which is used for maintaining known failure information relating to a known network resource failure (or specifying that there is no known network resource failure). The maintaining of these three memories (which is practice may be part of a single memory) is represented as step S1 in the flowchart of FIG. 7.

The first processing unit 10 comprises a receiver 18. In step S2, a failure notification relating to a network resource failure is received by the receiver 18, and is passed to a processor 20. The failure notification (e.g. concerning a loss of connectivity between two routers of the network) may be received via any one or more of the following mechanisms: Bidirectional Forwarding Detection (BFD); L2 upcall; FPN (see PCT Patent Application No. PCT/EP2010/059391); and an out-of-band signalling network. In response to receipt of the failure notification, in step S3 it is determined by the processor 20 from the failure notification how, if at all, the known failure information stored in the KFI memory 16 is to be updated. If required, the processor 20 causes the known failure information to be updated in step S4. In either case, processing returns to step S1.

In step S5, a communications packet is received by the receiver 18 and is passed to the processor 20. The following steps S6 to S10 are taken in response to receipt of the communications packet. In step S6 the destination node for the received packet is determined by the processor 20 from the received packet. In step S7 it is determined by the processor 20 whether the next hop node specified by the forwarding information for the determined destination node is potentially invalid in view of the known failure information. If so, then in step S8 the processor 20 causes, if necessary, the next hop node for the determined destination node to be updated in the forwarding information stored in the FI memory 12, using the update information stored in the UI memory 14 and the known failure information stored in the KFI memory 16. In either case, in step S9 the processor 20 determines the next hop node for the received packet using the forwarding information from the FI memory 12 and the destination node determined from the received communications packet. (In the flowchart of FIG. 7 the updated forwarding information is used in step S9. In other words, if an update to the next hop node for the determined destination node is made in step S8, then the next hop node determined for the received packet in step S9 is the updated next hop. However, it could also be the case that, to save time, step S9 occurs before step S8 has had a chance to complete, so that the updated forwarding information is only used in a subsequent run through steps S5 to S10.) In step S10 the processor 20 causes a transmitter 22 of the first processing unit 10 to forward the received packet towards the determined next hop node.

The forwarding information may comprise a status flag corresponding respectively to each of the plurality of possible destination nodes. The status flag is for use in determining in step S7 whether the next hop node for the destination node concerned is potentially invalid in view of the known failure information.

Step S7 may comprise comparing the status flag corresponding to the determined destination node in the forwarding information to a corresponding status flag being maintained in the known failure information, and determining that the determined destination node is potentially invalid in view of the known failure information if there is a mismatch.

The method may comprise, if the next hop node for the determined destination node in the forwarding information is updated in step S8, also updating the status flag for the determined destination node in the forwarding information to indicate that the updated next hop node for the determined destination node in the forwarding information is valid in view of the known failure information.

The status flag for the determined destination node in the forwarding information may be updated so as to correspond to the status flag in the known failure information.

The status flag may specify a failure type. The failure type may be selected from a group of failure types comprising: (a) no failure; (b) link or link group failure; and (c) node failure.

The status flag may be implemented using a two-digit binary code.

The known failure information may specify the identity of the network resource failure.

The failure notification may specify a node and a link or link group, indicating that the network resource failure relates either to the specified node or to the specified link or link group.

Step S3 may comprise a comparison between the node and link or link group specified in the failure notification and previously-stored such node and link or link group information received in previous failure notifications. Step S4 may comprise setting or maintaining the status flag and the identity of the network resource in the known failure information based on the comparison.

The method may comprise, in response to receipt of the failure notification or a further such failure notification: reviewing and if necessary starting to update the next hop node for each of the possible destination nodes in the forwarding information using the update information and the information in the further failure notification. For example, a lazy update procedure could be performed initially, and at the same time a greedy update procedure could be set in motion (e.g. in the background).

The steps may be performed in a forwarding processor (FPU 10) of the router. The update information may be preconfigured in the forwarding processor by a control processor of the router (CPU 30).

The known failure information may be stored in a fast memory of the router, such as SRAM. Thus, the KFI memory may be or be part of an SRAM.

The network resource failure to which the known failure information relates may relate to the failure of a plurality of network resources.

Steps S2 to S4 can be considered to correspond generally to part 1 of section 4 described above (collecting of known failures). Steps S5 to S10 can be considered to correspond generally to parts 5 and 6 of section 4 described above (Lazy FIB update and Combined FIB update). Parts of step S1 can be considered to correspond generally to section 3 described above (preparation for failures). However, the correspondence between the steps of FIG. 7 and the above-described sections is not exact, but the skilled reader will ready understand how the more detailed description described previously relates to the more general description described with reference to FIGS. 7 and 8.

It will be appreciated that operation of one or more of the above-described components can be provided in the form of one or more processors or processing units, which processing unit or units could be controlled or provided at least in part by a program operating on the device or apparatus. The function of several depicted components may in fact be performed by a single component. A single processor or processing unit may be arranged to perform the function of multiple components. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

It will also be appreciated by the person of skill in the art that various modifications may be made to the above-described embodiments without departing from the scope of the present invention as defined by the appended claims.

The invention claimed is:

1. A method for use by a router in a communications network, comprising:
   maintaining forwarding information specifying a next hop node for each of a plurality of possible destination nodes;
   maintaining update information specifying how, if at all, the next hop nodes specified in the forwarding information are to be updated for a plurality of possible network resource failures;
   maintaining known failure information relating to a known network resource failure or specifying that there is no known network resource failure;
   receiving a failure notification relating to a network resource failure, and in response to receipt of the failure notification:
      determining from the failure notification how, if at all, the known failure information is to be updated;
      updating the known failure information, if required, based on the determination;
   receiving a communications packet, and in response to receipt of the communications packet:
      determining a destination node for the received packet;
      determining whether the next hop node specified by the forwarding information for the determined destination node is potentially invalid in view of the known failure information;
      if so, then updating if necessary the next hop node for the determined destination node in the forwarding information based on the update information and the known failure information;
      determining the next hop node for the received packet based on the forwarding information and the determined destination node; and
      forwarding the received packet towards the determined next hop node.

2. The method of claim 1 wherein the forwarding information comprises a status flag corresponding respectively to each of the plurality of possible destination nodes, and wherein determining whether the next hop node for the determined destination node is potentially invalid in view of the known failure information is based on the status flag.

3. The method of claim 2 wherein the status flag is implemented using a two-digit binary code.

4. The method of claim 3 wherein the known failure information specifies the identity of the network resource failure.

5. The method of claim 4 wherein the failure notification specifies a node and a link or link group, indicating that the network resource failure relates either to the specified node or to the specified link or link group.

6. The method of claim 5 wherein determining from the failure notification how, if at all, the known failure information is to be updated comprises comparing between the node and link or link group specified in the failure notification, and a previously-stored node and link or link group information received in a previous failure notification, and wherein updating the known failure information, if required, based on the determination comprises setting or maintaining the status flag and the identity of the network resource in the known failure information based on the comparison.

7. The method of claim 2 wherein determining whether the next hop node for the determined destination node is potentially invalid in view of the known failure information based on the status flag comprises:
   comparing the status flag corresponding to the determined destination node in the forwarding information to a corresponding status flag being maintained in the known failure information; and
   determining that the determined destination node is potentially invalid in view of the known failure information if there is a mismatch.

8. The method of claim 7 wherein if the next hop node for the determined destination node in the forwarding information is updated, the method further comprises updating the status flag for the determined destination node in the forwarding information to indicate that the updated next hop node for the determined destination node in the forwarding information is valid in view of the known failure information.

9. The method of claim 8 wherein the status flag for the determined destination node in the forwarding information is updated to correspond to the status flag in the known failure information.

10. The method of claim 7 wherein the status flag specifies a failure type.

11. The method of claim 10 wherein the failure type is selected from a group of failure types comprising no failure, link or link group failure, and node failure.

12. The method of claim 1 wherein, if an update to the next hop node for the determined destination node is made, then determining the next hop node for the received packet based on the forwarding information and the determined destination node comprises determining the next hop node to be the updated next hop.

13. The method of claim 1 wherein responsive to receiving the failure notification or a subsequent failure notification, further comprising:
   determining whether to update the next hop node for each of the possible destination nodes in the forwarding information; and
   updating the next hop node for each of the possible destination nodes in the forwarding information based on the update information, and on the information in the failure notification or the subsequent failure notification.

14. The method of claim 1 wherein the method is performed in a forwarding processor of the router, and wherein the update information is pre-configured in the forwarding processor by a control processor of the router.

15. The method of claim 1 further comprising storing the known failure information in a fast memory of the router.

16. The method of claim 1 wherein the network resource failure indicated by the known failure information is associated with a failure of a plurality of network resources.

17. An apparatus for use as a router, or in a router, of a communications network, the apparatus comprising:
- a forwarding information(FI) memory configured to store forwarding information specifying a next hop node for each of a plurality of possible destination nodes;
- an update information (UI) memory configured to store update information specifying how, if at all, the next hop nodes specified in the forwarding information are to be updated for a plurality of possible network resource failures;
- a known failure information (KFI) memory configured to store known failure information specifying a known network resource failure, or specifying that there is no known network resource failure;
- a receiver configured to receive a failure notification relating to a network resource failure;
- a processor configured to receive the failure notification and to:
  - determine from the failure notification how, if at all, the known failure information is to be updated;
  - update the known failure information, if required, based on the determination;
- the receiver further configured to receive a communications packet; and
- in response to receipt of the communications packet, the processor further configured to:
  - determine a destination node for the received packet;
  - determine whether the next hop node specified by the forwarding information for the determined destination node is potentially invalid in view of the known failure information;
  - if so, updating if necessary the next hop node for the determined destination node in the forwarding information based on the update information and the known failure information;
  - determine the next hop node for the received packet based on the forwarding information and the determined destination node; and
  - forward the received packet towards the determined next hop node.

18. A computer program product comprising a non-transitory computer readable storage medium having computer readable code stored thereon, which when executed by an apparatus in a communications network, controls the apparatus to: maintain forwarding information specifying a next hop node for each of a plurality of possible destination nodes; maintain update information specifying how, if at all, the next hop nodes specified in the forwarding information are to be updated for a plurality of possible network resource failures; maintain known failure information relating to a known network resource failure or specifying that there is no known network resource failure; receive a failure notification relating to a network resource failure, and in response to receipt of the failure notification: determine from the failure notification how, if at all, the known failure information is to be updated; update the known failure information, if required, based on the determination; receive a communications packet, and in response to receipt of the communications packet: determine a destination node for the received packet; determine whether the next hop node specified by the forwarding information for the determined destination node is potentially invalid in view of the known failure information; if so, update the next hop node for the determined destination node in the forwarding information based on the update information and the known failure information; determine the next hop node for the received packet based on the forwarding information and the determined destination node; and forward the received packet towards the determined next hop node.

* * * * *

UNITED STATES PATENT AND TRADEMARK OFFICE
CERTIFICATE OF CORRECTION

PATENT NO. : 9,264,322 B2
APPLICATION NO. : 13/811716
DATED : February 16, 2016
INVENTOR(S) : Császár et al.

It is certified that error appears in the above-identified patent and that said Letters Patent is hereby corrected as shown below:

In the Drawings

Figure 1:
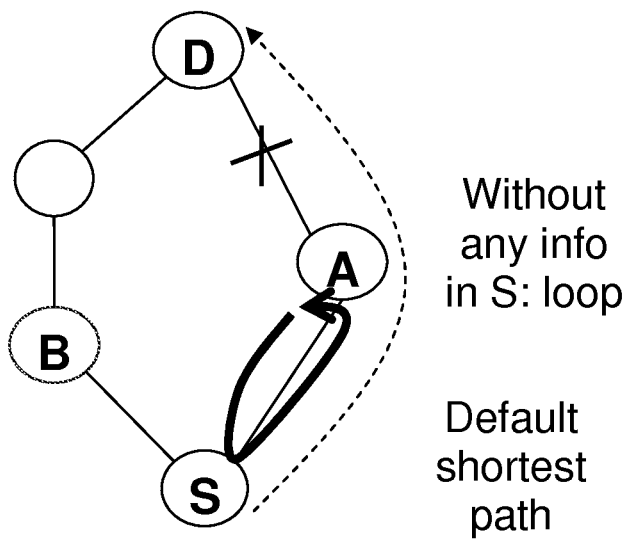
FIG. 1, discussed hereinbefore, illustrates forwarding inconsistency in case of local repair; the path of S to D leads through A.
Figure 2:
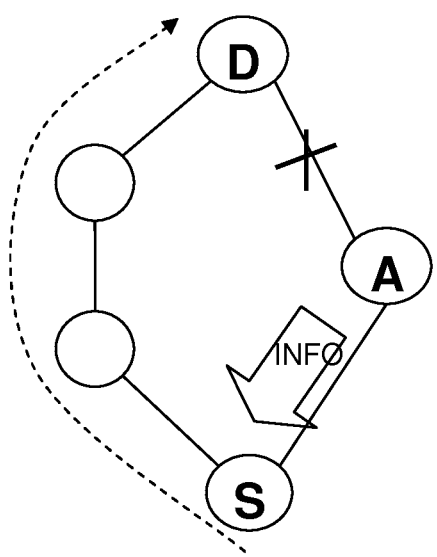
FIG. 2, discussed hereinbefore, illustrates the information required concerning the failure to provide consistent forwarding; S is required to change its default path.

In Fig. 2, Sheet 1 of 13, below Figure, insert -- PRIOR ART --.

Signed and Sealed this
Fourteenth Day of June, 2016

Michelle K. Lee
*Director of the United States Patent and Trademark Office*